United States Patent [19]
Dobesch

[11] 3,791,211
[45] Feb. 12, 1974

[54] WIND DIRECTION INDICATOR FOR SAILBOATS

[75] Inventor: Franz Xaver Dobesch, Villingen, Germany

[73] Assignee: VDO Tachometer Werke Adolf Schindling GmbH, Frankfurt am Main, Germany

[22] Filed: Aug. 9, 1971

[21] Appl. No.: 170,059

[52] U.S. Cl. .................................................. 73/188
[51] Int. Cl. ............................................. G01w 1/00
[58] Field of Search .......... 73/188, 189, 180, 170 R; 324/45

[56] References Cited
UNITED STATES PATENTS 2,363,087  11/1944  Salisbury ............................... 73/188
3,365,594  1/1968  Davidson ........................... 324/45 X
3,194,990  7/1965  Kendall .............................. 324/45 X
3,208,276  9/1965  Wood et al. ....................... 73/189 X

FOREIGN PATENTS OR APPLICATIONS 231,889  2/1959  Australia ............................... 324/45

Primary Examiner—James J. Gill
Attorney, Agent, or Firm—Ernest G. Montague

[57] ABSTRACT

A wind direction indicator for sail boats, which comprises a vane. A rotatably mounted permanent magnet is connected with the vane and is adapted to operate as a measuring value indicator. A controllable semiconductor is controlled by the magnetic field of the permanent magnet in dependency upon the wind direction to the midship line of said boat.

2 Claims, 5 Drawing Figures

FIG. 1.
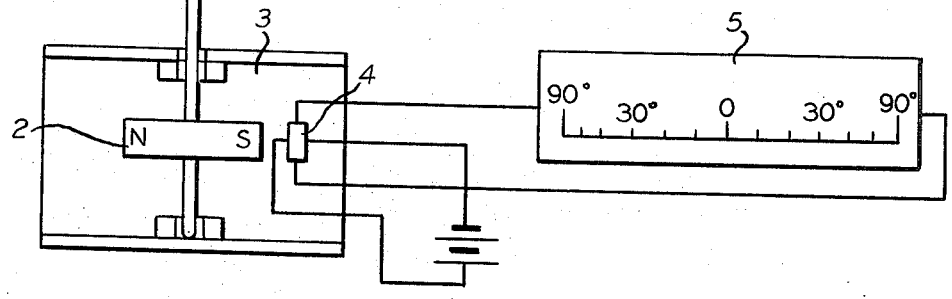
FIG. 2.
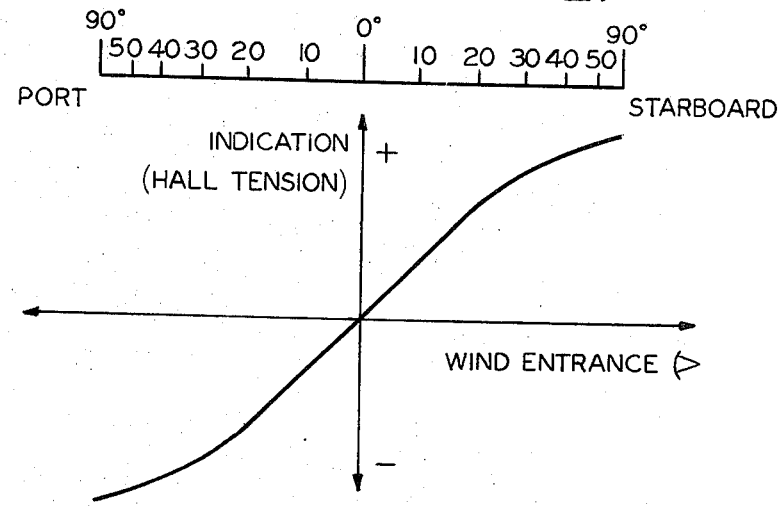
FIG. 3.
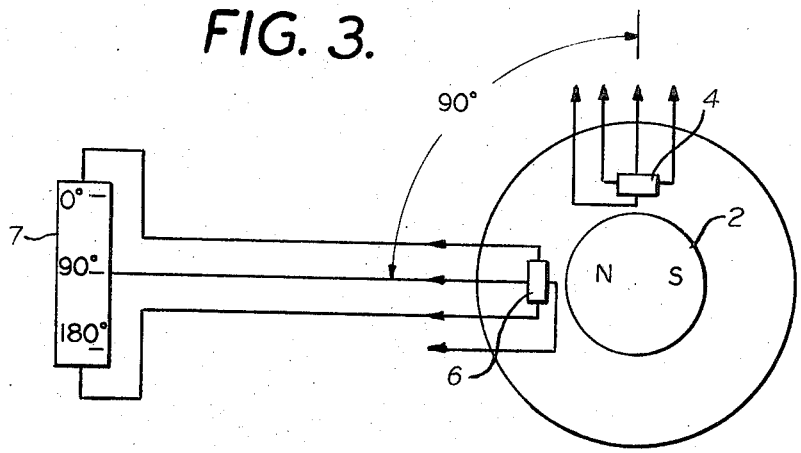

WIND DIRECTION INDICATOR FOR SAILBOATS

The present invention relates to a wind direction indicator for sailboats, in general, and to a device for the remote indication of the wind direction, with a measuring value indicator operating without contact and without engagement, in particular. The indication of the wind direction takes place by, example, by means of a moving coil measuring instrument with a zero point in the scale center. A wind occurring to both sides of the midship line of the boat is particularly well readable by spreading the indication within the range of 0° to 50°.

A wind direction indicator is known, in which the transmission of the vane position to the indication instrument takes place in accordance with the principle of the electric wave. The rotary shaft of the vane is coupled by means of two slides with an endless wound three times tapped annular slide resistance. Over both rotatable slides the required auxiliary direct voltage is fed to the annular slide resistance, so that at its three tappings part voltages can be tapped, the value of which depends upon the position of the slides and thereby upon the direction of the wind. The part voltages are transmitted to the three windings of the rotary magnet receiver disposed in the indication device. A permanent magnet rotatably disposed centrally within the windings orients itself in the magnetic field of the windings and the pointer secured to the same axle can indicate on an immovable 360°-scale the corresponding wind direction.

Furthermore, a wind direction indicator is known which operates in accordance with the rotary field system. For the transmission of the position of the vane, a rotary field is provided as a transmitter and a rotary field system as receiver is required. The rotors of the rotary field systems are excited by means of alternating voltage. If the rotor of the transmitter is turned by means of the vane, compensating currents flow in the stator windings of the transmitter and receiver, which exert a rotary moment upon the rotor of the receiver as long until the latter assumes the same position as the rotor of the transmitter. A pointer secured to the rotor shaft of the receiver serves the indication of the wind direction.

Also a wind direction indicator is known, the transmitter of which consists of a multiple part collector with a slide contact. The connection to the indication device takes place by means of a multi contactor cable. Several signal lines serve the indication. This type of wind direction indicator does not fulfill the requirement for a continuous indication.

The drawbacks of the known wind direction indicator are in the use of sliding contacts, which reduce the operational safety and cause additional friction losses. The rotary field system requires an alternating current for the field excitation. The latter must be contained from the board battery by transformation.

It is one object of the present invention to provide a wind direction indicator for sailboats, wherein a magnetically controllable semi-conductor element by example a Hall-generator or a magnet diode, the galvano magnetic effect of which is exploited.

With these and other objects in view, which will become apparent in the following detailed description, the present invention will be clearly understood in connection with the accompanying drawings, in which:

FIG. is a schematic view of a first embodiment of the indicator device;

FIG. 2 is a diagram depicting the Hall voltage with the control field;

FIG. 3 is a diagramatic showing of the device with two Hall-generators;

Figure 4:
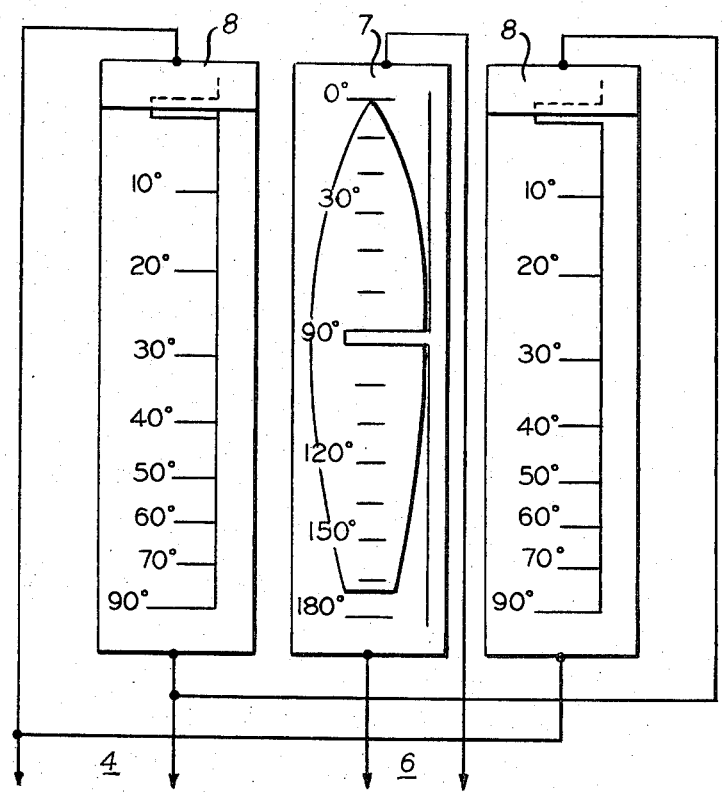
FIG. 4 is a device arrangement with two moving coil measuring instruments.
Figure 5:
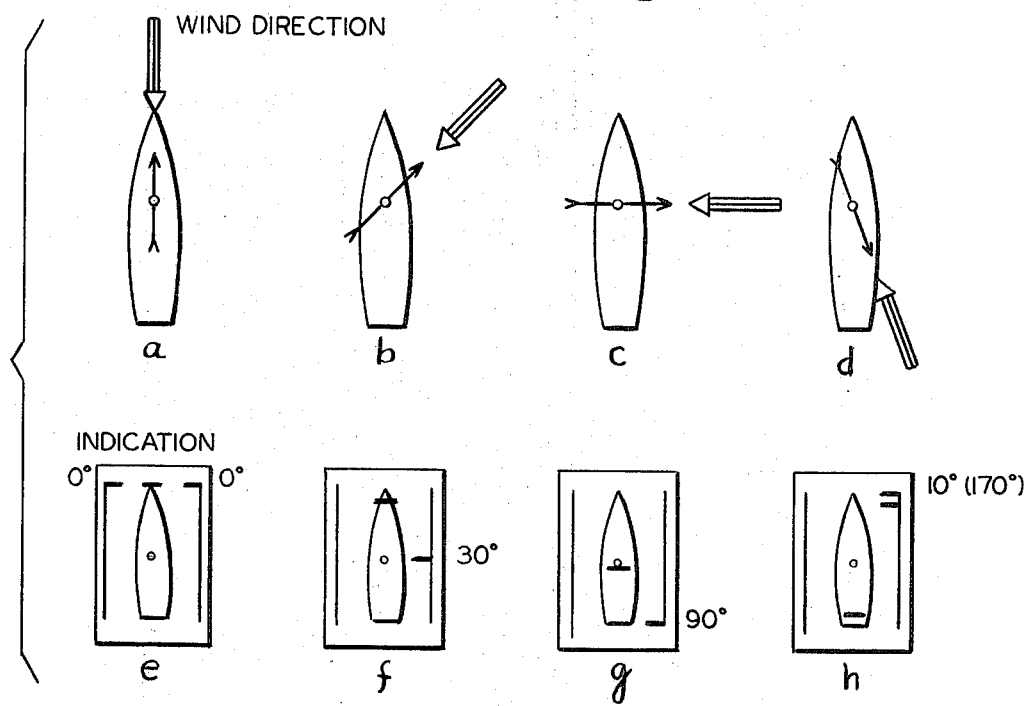
FIG. 5 is a schematic showing of the application of different wind directions.

A radially magnetized permanent magnet 2 is secured on the shaft of a vane 1 and is rotatably mounted in the housing 3.

At a short distance from the magnet is disposed the magnetically controllable semi-conductor element 4. The magnetic field lines of the magnet influence depending upon the position of the North-South-axis in the semi-conductor element its galvano-magnetic characteristics. In order to obtain the desired spreading of the indication within the range of 0° to 50° the zero passage of the magnetization between the north-south-pole of the magnet 2 is used for the indication of the angle 0° to the mid-ship line of the boat. The connection between the Hall voltage and the control field in dependency upon the rotary angle of the vane is shown in FIG. 2.

The voltage delivered by the Hall generator 4 is fed to a moving coil measuring system 5 with a zero point in the scale center, the scale of which is equipped with angular degrees. In a position of the vane at an angle of 90° to the mid-ship line, the full amplitude of the pointer to the right and towards the left, respectively, is obtained. Upon surpassing the 90° angle the pointer moves again in the direction of the zero marker.

Upon the wind introduction into the direction of the mid-ship line from the after deck (about 180°) the pointer reaches again the zero mark. This results thus also in a straight indication on the pre-wind course of the ship. The described arrangement is suitable first of all for the use with a good view during daylight, because due to the 180° indication no distinction can be found between forward wind and after wind.

In ships which require also in case of a bad view or at night a wind direction indicator in the range of 360° of the rose of the compass an arrangement with two Hall generators set off for 90° in accordance with FIG. 3, is provided. The two semi-conductors are arranged to the magnetic zero line between the north and south pole of the permanent magnet such that the influence of the semi-conductor 4 by a vane position in a direction of the midship line becomes a minimum and simultaneously the influence of the semi-conductor 6 becomes a maximum. The Hall voltage delivered from the Hall generator 6 is fed to another moving coil measuring system 7, the pointer position of which indicates that the wind comes in from the front or from the after deck. An instrument arrangement suitable therefor is apparent from FIG. 4.

It comprises three moving coil systems with a profile scale. The left scale shows the wind-in-coming direction from the port side, the right scale the wind-in-coming direction from the star board. The left and right moving coil systems are connected and fed from the semi-conductor 4 of FIG. 3, as indicated in FIG. 4, in parallel and in opposite polarity. The center scale serves the indication whether the wind comes in from the front or the back and is connected to the semiconductor 6 of FIG. 3. The moving coil systems or port or starboard wind indication have scale divisions of 0° to 90°. The range under 0° is for better viewing covered by a screen 8. The indicator of the not required instrument is in this case behind the cover screen 8.

By the use of three scales a great total scale length results for the arrangement of the 360° range of the rose of the compass, with a scale spreading in the most important ranges.

While I have disclosed several embodiments of the present invention, it is to be understood that these embodiments are given by example only and not in a limiting sense.

I claim:

1. A wind direction indicator for sail boats, comprising a vane, a rotatably mounted permanent magnet connected with said vane and adapted to operate as a measuring value indicator, two controllable semi-conductors disposed influencable by the magnetic field of said permanent magnet, said two semi-conductors being arranged to the magnetic zero line between the north and south pole of said permanent magnet such that the influence of one of said semi-conductors by a position of said vane in a direction of the midship line becomes a minimum, and simultaneously the influence of the other of said semi-conductors becomes a maximum, three moving coil instrument means for the remote indication of the wind angle, and two of said moving coil instrument means being connected in parallel in opposite polarity to, and being fed by, said one of said semi-conductors, and said two of said moving coil instrument means serving for a spreaded indication of the wind direction in a range of the midship line from port or starboard, the third of said moving coil instrument means being connected to and fed by said other of said semi-conductors and serving for a spreaded indication of a wind direction in a range perpendicular to the midship line from front or from back.

2. The wind direction, indicator as set forth in claim 1, wherein said three measuring coil instrument means are constructed as measuring devices with profile scales and are arranged next to one another such that the scales of the two measuring coil instrument means for the indicator of the port or starboard wind direction lie to the left and right, respectively, of the scale of the third measuring coil instrument means for the indication of the wind direction from the front or back.

* * * * *